HIGH FREQUENCY ATTENUATOR

Filed Jan. 27, 1955 3 Sheets-Sheet 1

Donald J. Sommers
William J. Wilson
*INVENTOR.*

BY [signature]

Attorney

Oct. 20, 1959 D. J. SOMMERS ET AL 2,909,736

HIGH FREQUENCY ATTENUATOR

Filed Jan. 27, 1955 3 Sheets-Sheet 2

Donald J. Sommers
William J. Wilson
INVENTOR.

BY [signature]
Attorney

Donald J. Sommers
William J. Wilson
*INVENTOR.*

BY [signature]

Attorney

United States Patent Office 2,909,736

Patented Oct. 20, 1959

2,909,736

HIGH FREQUENCY ATTENUATOR

Donald J. Sommers, Brookline, and William J. Wilson, Nashua, N.H., assignors, by mesne assignments, to Sanders Associates, Incorporated, Nashua, N.H., a corporation of Delaware Application January 27, 1955, Serial No. 484,406

9 Claims. (Cl. 333—81)

The present invention is related to high frequency electric transmission lines. More particularly, the invention relates to wave-translating devices adapted to use flat strip transmission lines. More especially, the invention relates to attenuator devices utilizing flat strip transmission lines.

In the prior art, a number of wave-translating devices are taught for use with conventional coaxial and wave guide transmission lines as well as for flat strip transmission lines. More particularly, a number of such devices provide a predetermined degree of attenuation for such lines. These devices characteristically require the wave-translating or attenuation mechanism to operate in a plane parallel to the electric lines of force. This restraint results in relatively complex, heavy and expensive structures. Furthermore, particularly in wave guide applications, the band-pass characteristic (ability to pass a range of frequencies) is relatively limited. In addition, it is difficult with such devices to provide a simple mechanism for linearly varying the degree of wave-translation or attenuation.

It is, therefore, an object of the present invention to provide an improved wave-translating device for high frequency transmission lines characterized by simplicity of structure.

Another object of the invention is to provide an improved wave-translating device for high frequency lines having a wide band-pass characteristic.

Yet another object of the present invention is to provide an improved variable wave-translating device for high frequency electric transmission lines characterized by a relatively high degree of linearity of variation.

Still another object of the present invention is to provide an improved attenuator for high frequency electric transmission lines having a wide band-pass characteristic.

A further object of the present invention is to provide an improved attenuator for high frequency electric transmission lines of simple design and economy of manufacture.

A still further object of the present invention is to provide an improved variable attenuator for high frequency electric transmission lines providing a high degree of attenuation.

Other and further objects of the invention will be apparent from the following description of preferred embodiments, taken in connection with the accompanying drawings.

In accordance with the present invention, there is provided a unitary, composite, wave-translating device for high frequency transmission lines. The device includes a pair of planar, outer conductors providing ground planes. A pair of spaced, elongated planar, inner conductors are adjacently disposed in different planes in register, in parallel with and in insulated space relation between the outer conductors. The inner conductors are coupled together to operate electrically as a single conductor while substantially confining high frequency energy between each inner conductor and its adjacent outer conductor. Means are disposed on a plane intermediate the planes of the inner conductors for coupling high frequency energy from both of the inner conductors.

In one form of the invention, there is provided a composite attenuator for high frequency electric transmission lines. The device includes a pair of spaced, flat, parallel outer conductors providing electrical ground planes. A pair of flat, elongated inner conductors are formed into a pair of U-shaped loops disposed in register in different planes parallel with and in insulated spaced relation between the outer conductors. A thin flat, attenuator card of substantially semi-circular shape is pivotally mounted at approximately the center of the arcs of the inner conductors for rotation therebetween. The shape of the card in combination with the pivotally mounted position within the loops enables progressively increasing areas of the card, when inserted between the inner conductors, by rotation of the card to provide desired increments in attenuation within a given range for high frequency energy passing through the attenuator.

Figure 1:
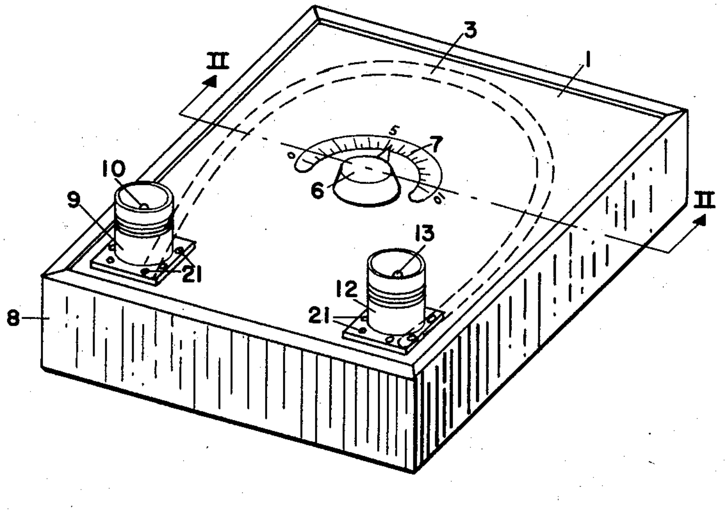
Fig. 1 is an isometric view of a preferred embodiment of the present invention.
Figure 2:
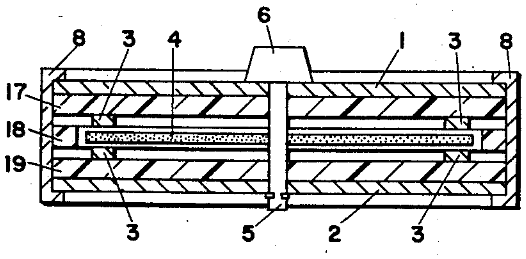
Fig. 2 is a cross-section of the embodiment of Fig. 1 taken along the line II—II of Fig. 1.
Figure 3:
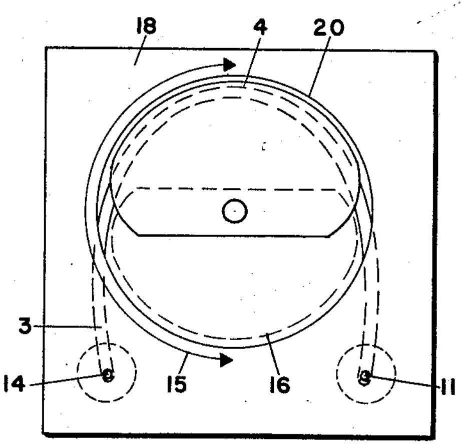
Fig. 3 is a bottom view of a part of the embodiment in Fig. 1.

Referring now to the drawings, and with particular reference to Figs. 1, 2, 3 and 4, a unitary composite, wave-translating device as shown. More particularly, the embodiment here illustrated is a composite attenuator for high frequency electric transmission lines. As shown, the attenuator comprises a first flat outer conductor 1 and a second flat outer conductor 2 providing electrical ground planes. An inner conductor assembly, for example, a pair of flat elongated inner conductors 3 are formed into a loop in a plane parallel to and disposed in register in insulated spaced relation between the outer conductors 1 and 2. An attenuation material, here shown as a resistor card 4, is disposed between the inner conductor assembly and at least one of the outer conductors, more particularly, the inner conductors 3 and provides a predetermined degree of attenuation to high frequency electric energy passing through the attenuator. The card 4 is so rotatably mounted with respect to the loop formed by the inner conductor 3 as to introduce different areas of the card between the inner conductors 3 with different degrees of rotation of the card 4.

The card 4 is comprised of a suitable mixture of carbon granules and is pivotally suspended between the conductors 3 by a rotatable shaft 5 which is positioned by means of a knob 6 as indicated by a calibrated dial plate 7. The card 4 may be rotated as indicated by the arrows at 15 into the positions shown by the phantom lines 16. The conductors 3 have the configuration of an open-ended loop, as shown. Conductive means, here illustrated as a copper seal 8, surround the inner conductor 3 and resistor card 4 and connect the outer conductors together to confine electric energy within the confines of the outer conductors.

An input transducer means, here shown as a coaxial connector 9, has its center conductor 10 connected to a pair of ends 11 of the inner conductors 3. An output transducer means, here shown as a coaxial connector 12, has its inner conductor 13 connected to the other pair of ends 14 of the inner conductors 3. The inner conductors are thus coupled or connected together to operate electrically as a single conductor.

Dielectric means, here shown as plastic insulating plates 17, 18 and 19, hold the conductors in insulated spaced relation as shown. The plastic insulators are preferably formed of teflon fibreglas laminate. The plate 18 has a hole 20 formed therein to permit rotation of the card 4. The coaxial connectors 9 and 12 have their outer conductors connected to the outer conductors 1 and 2 by conductive pins 21 through holes 26. The pins may be brass rivets or screws. The shaft 5 is inserted through holes 23 in the various components and locked in place with the clamping ring 22, as shown. The center conductors 10 and 13 of the coaxial connectors are inserted through holes 24 and 25 to contact the inner conductors 3 at the respective ends 11 and 14.

Figures 4, 5, 6:
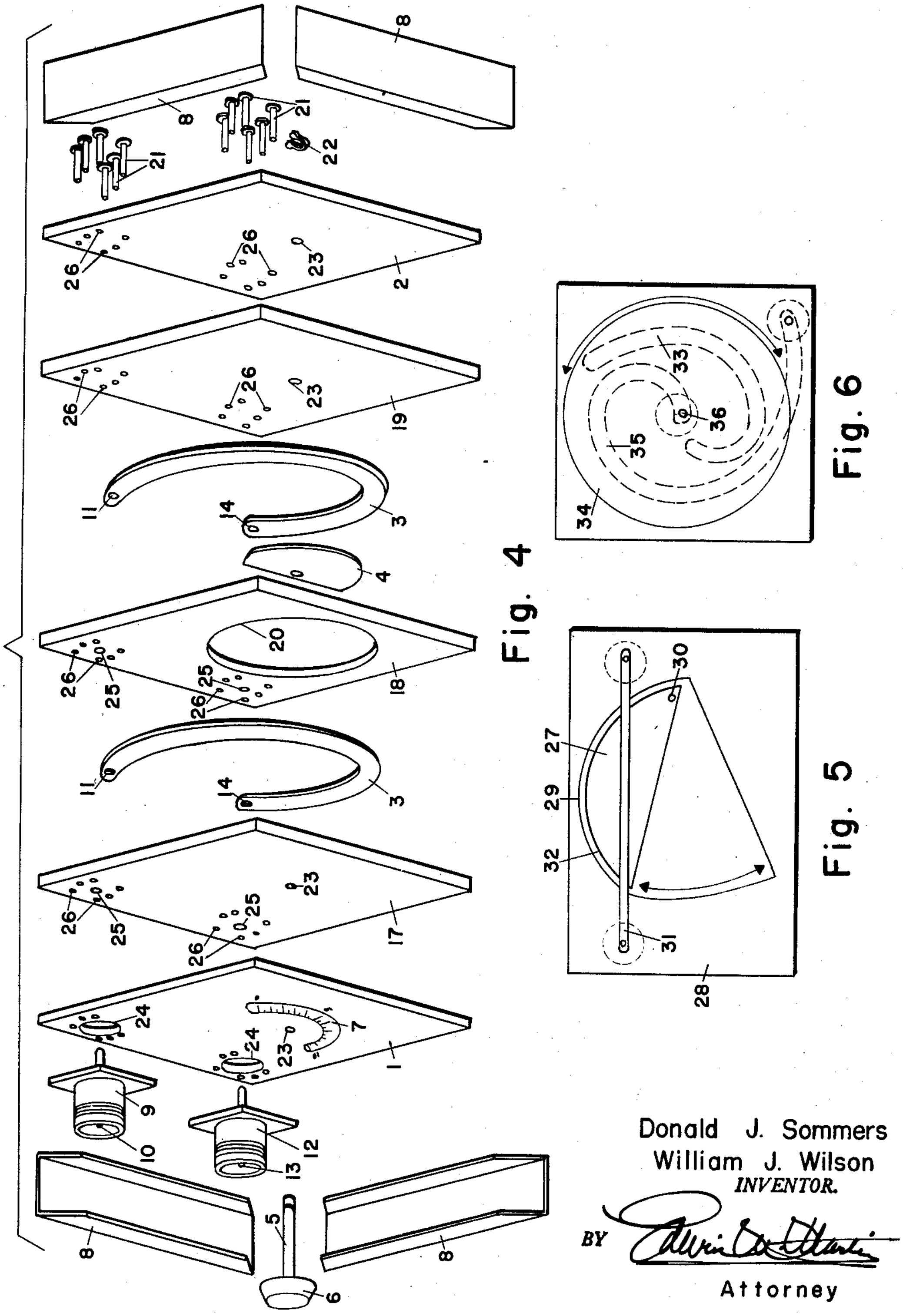
Fig. 4 is an exploded view of the embodiment in Fig. 1.
Fig. 5 is a plan view illustrating another embodiment of the invention.
Fig. 6 is a plan view illustrating still another embodiment of the invention.

In Fig. 5 a modification of the invention is shown in which a resistive card 27 is disposed in a slot 29 formed in the dielectric insulator 28. The card pivots about a point 30 to permit adjustment of its position between an inner conductor 31 and an outer conductor 32. The other outer conductor and dielectric insulator are not shown, but in practice are placed on top of the inner conductor 31 congruent with the insulator 28, providing an attenuator wherein the inner conductor 31 is held in insulated spaced relation between a pair of flat outer conductors.

In Fig. 6 resistive material 33 is disposed beneath a thin disk dielectric insulating material 34. An inner conductor 35 and resistive material 33 are disposed in a generally involute configuration, as shown. Rotation of the card 34 about its pivot point 36 provides a variable degree of attenuation between the inner conductor 35 and a flat outer conductor not shown. Here the resistive material is congruent with the inner conductor for maximum attenuation.

Figure 7:
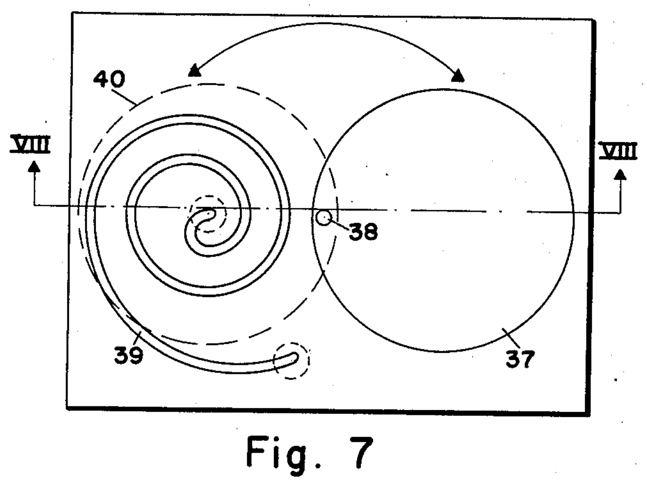
Fig. 7 is a plan view illustrating a modification of the embodiment in Fig. 6.
Figure 8:
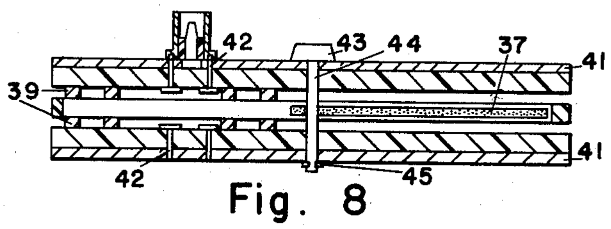
Fig. 8 is a sectional view illustrating the complete structure of the embodiment in Fig. 7 taken along the line VIII—VIII of Fig. 7.

In Fig. 7 a disk 37 of resistive material is pivotally supported about a pivot point 38. An inner conductor 39 has a spiral configuration as shown. Maximum attenuation is obtained when the disk 37 is in the position of the phantom lines indicated at 40. In the sectional view of Fig. 8, the disposition of the inner conductors 39 between a pair of flat outer conductors 41 is shown. Mode suppressors 42 are split and capacitively coupled as illustrated to permit the card 37 to be rotated between the conductors 39. A knob 43 is connected to a shaft 44 which pivotally supports the resistor card 37. The shaft 44 is held in place by a clamping ring 45.

Figure 9:
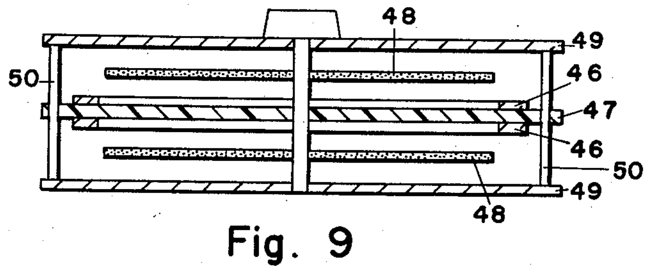
Fig. 9 is a sectional view illustrating another embodiment of the invention.

In the embodiment of Fig. 9, a pair of inner conductors 46 are disposed on either side of a dielectric insulating means 47. A pair of resistive cards 48 are each disposed between an inner conductor 46 and an outer conductor 49. Conductive members 50 connect the outer conductors together and are disposed less than a quarter of a wave length apart at the highest operating frequency in a direction perpendicular to the plane of the drawing. The inner conductors 46 have the configuration of the inner conductors 3 in Fig. 1.

Figure 10:
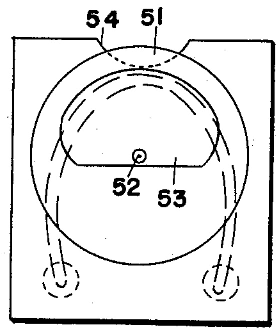
Fig. 10 is a plan view illustrating a modification of the embodiment of Fig. 1.
Figure 11:
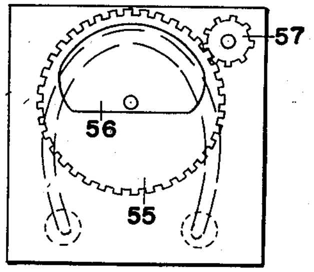
Fig. 11 is a plan view of another modification of the embodiment of Fig. 1.

Fig. 10 illustrates a modification of the embodiment of Fig. 1 in which a circular disk 51 supports the resistive material 53 about a pivot point 52. The disk is serrated along its circumference and so positioned near an opening 54 as to permit a direct manual adjustment of the degree of attenuation. Fig. 11 is a further modification of the embodiment of Fig. 1 in which the outer circumference of a disk 55 carries resistive material 56 and is formed with gear teeth as shown. A second smaller gear 57 is coupled to the gear 55 providing an inverse gear ratio, whereby micrometer or vernier adjustments may be realized.

The insertion of the resistive material between inner conductors provides attenuation because of the fringing fields between the inner and outer conductors. These devices typically propagate high frequency energy of the TEM mode in which proper operation depends upon the outer conductors being at the same potential with respect to the inner conductors at all times. If the fields become asymmetric or unbalanced, for some reason, other propagation modes which tend to radiate may appear. In Figs. 5 and 9 the resistive material is disposed between an outer conductor and an inner conductor. Fig. 5 only shows one layer of resistive material used between one of the outer conductors and the inner conductor. This produces a slight unbalance which in critical applications may not be tenable. By inserting the resistive material on either side of the inner conductor as shown in Fig. 9 a balanced condition is preserved.

In each of the embodiments shown, the configuration of the resistive material is chosen to provide substantially a constant impedance match. Abrupt introduction of resistive material in the signal fields effects impedance discontinuities, producing reflections in the transmission lines.

The present invention greatly enhances the flexibility and application of microwave transmission lines and devices. Modern etched circuit techniques with all of their advantages of economy of manufacture and stable reproducibility, may now be fully utilized in a field where such devices and transmission lines are commonly referred to as high frequency plumbing.

While there has been hereinbefore described what is at present considered preferred embodiments of the invention, it will be apparent that many and various changes and modifications may be made with respect to the embodiments illustrated, without departing from the spirit of the invention. It will be understood, therefore, that all such changes and modifications as fall fairly within the scope of the present invention, as defined in the appended claims, are to be considered as a part of the present invention.

What is claimed is:

1. A composite attenuator for high frequency electric transmission lines, comprising: a first flat outer conductor providing an electrical ground plane; a second flat outer conductor providing another electrical ground plane parallel to the first; a pair of flat elongated inner conductors formed into a pair of parallel loops disposed in register and in different planes parallel to and in insulated spaced relation between said outer conductors, said inner conductors being connected together to operate electrically as a single conductor; and a thin flat attenuator card pivotally mounted within the arcs of said inner conductors for rotation therebetween, the shape of said card in combination with the pivotal mounting position within said loops being such that progressively increasing areas of said card are inserted between said inner conductors with rotation of said card to provide desired increments of attenuation within a given range for high frequency energy passing through said attenuator.

2. A composite attenuator for high frequency electric transmission lines, comprising: a first flat outer conductor providing an electrical ground plane; a second flat outer conductor providing another electrical ground plane parallel to the first; a pair of flat elongated inner conductors formed into a pair of parallel loops disposed in register and in different planes parallel to and in insulated spaced relation between said outer conductors, said inner conductors being connected together to operate electrically as a single conductor; and a thin flat attenuator card of substantially semicircular shape pivotally mounted within the arcs of said inner conductors for rotation therebetween, the shape of said card in combination with the pivotal mounting position within said loops being such that progressively increasing areas of said card are inserted between said inner conductors with the rotation of said card to provide desired increments of attenuation within a given range for high frequency energy passing through said attenuator.

3. A composite attenuator for high frequency electric transmission lines, comprising: a first flat outer conductor providing an electrical ground plane; a second flat outer conductor providing another electrical ground plane parallel to the first; a pair of flat elongated inner conductors formed into a pair of parallel U-shaped loops disposed in register and in different planes parallel to and in insulated spaced relation between said outer conductors, said inner conductors being connected together to operate electrically as a single conductor; and a thin flat attenuator card of substantially semicircular shape pivotally mounted at approximately the center of the arcs of said inner conductors for rotation therebetween, the shape of said card in combination with the pivotal mounting position within said loops causing progressively increasing areas of said card, when inserted between said inner conductors by rotation of said card, to provide desired increments of attenuation within a given range for high frequency energy passing through said attenuator.

4. A composite attenuator for high frequency electrical transmission lines, comprising: a first planar outer conductor providing an electrical ground plane; a second planar outer conductor parallel to said first outer conductor and providing an electrical ground plane; a first planar inner conductor disposed parallel to said outer conductors and in insulated spaced relation thereto; a second planar inner conductor disposed in register with and in proximity and parallel to said first inner conductor, said inner conductors being in different planes and electrically connected together to operate electrically as a single conductor; and attenuation material disposed between said inner conductors to provide a predetermined degree of attenuation to energy transmitted therethrough.

5. A unitary, composite, wave-translating device for high frequency transmission lines, comprising: a pair of planar, outer conductors providing ground planes; a pair of spaced, elongated, planar, inner conductors adjacently disposed in different planes in register and in parallel with and in insulated, spaced relation between said outer conductors, said inner conductors being connected together to operate electrically as a single conductor while substantially confining high frequency energy between each inner conductor and its adjacent outer conductor; and means disposed on a plane intermediate the planes of said inner conductors for coupling high frequency energy from both of said inner conductors.

6. A unitary, composite, wave-translating device for high frequency transmission lines, comprising: a pair of planar, outer conductors providing ground planes; a pair of spaced, elongated, planar, inner conductors adjacently disposed in different planes in register and in insulated, spaced relation mid-way between said outer conductors, said inner conductors being connected together to operate electrically as a single conductor while substantially confining high frequency energy between each inner conductor and its adjacent outer conductor; and means disposed on a plane intermediate the planes of said inner conductors for coupling high frequency energy from both of said inner conductors.

7. A composite attenuator for high frequency, electric transmission lines, comprising: a first flat outer conductor providing an electrical ground plane; a second flat outer conductor providing an electrical ground plane; a pair of flat, elongated, inner conductors formed into a pair of identical parallel loops connected together to operate electrically as a single conductor and disposed in register in different planes parallel to and in insulated spaced relation between said outer conductors; and attenuator material disposed between said inner conductors and so rotatably mounted with respect to said loops as to introduce different areas of said attenuation material between said inner conductors with different degrees of rotation of said material to provide a predetermined degree of attenuation to the passing of electric energy through said attenuator.

8. A composite attenuator for high frequency, electric transmission lines, comprising: a first flat outer conductor providing an electrical ground plane; a second flat outer conductor providing an electrical ground plane; a pair of flat elongated inner conductors formed into a pair of parallel loops connected together to operate electrically as a single conductor and disposed in register in different planes parallel to and in insulated spaced relation between said outer conductors; and a pair of attenuator materials each disposed between one of said inner conductors and one of said outer conductors and so rotatably mounted with respect to said loops as to introduce different areas of said attenuation materials between said inner and outer conductors with different degrees of rotation of said material to provide a predetermined degree of balanced attenuation to the passing of electric energy through said attenuator.

9. A unitary, composite, wave-translating device for high frequency transmission lines, comprising: a pair of planar, outer conductors providing ground planes; a pair of spaced, elongated, planar, inner conductors adjacently disposed in different planes in register and in parallel with and in insulated, spaced relation between said outer conductors, said inner conductors being coupled together to operate electrically as a single conductor while substantially confining high frequency energy between each inner conductor and its adjacent outer conductor; and means disposed on a plane intermediate the planes of said inner conductors for coupling high frequency energy from both of said inner conductors.

References Cited in the file of this patent

UNITED STATES PATENTS

| | | |
|---|---|---|
| 2,515,228 | Hupcey | July 18, 1950 |
| 2,670,461 | Learned | Feb. 23, 1954 |
| 2,725,535 | Grieg et al. | Nov. 29, 1955 |

OTHER REFERENCES

"Electronics," June 1952, pages 114–118.